United States Patent
Matsumura et al.

(10) Patent No.: US 11,679,715 B2
(45) Date of Patent: Jun. 20, 2023

(54) VEHICLE INTERIOR-DEDICATED LIGHT EMITTING DEVICE

(71) Applicant: TOYODA GOSEI CO., LTD., Kiyosu (JP)

(72) Inventors: Kanae Matsumura, Kiyosu (JP); Hiroko Shibakawa, Kiyosu (JP); Kazuki Yabashi, Kiyosu (JP); Yasutsugu Sugiura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/875,864

(22) Filed: Jul. 28, 2022

(65) Prior Publication Data

US 2023/0045310 A1 Feb. 9, 2023

(30) Foreign Application Priority Data

Aug. 3, 2021 (JP) .............................. JP2021-127850

(51) Int. Cl.
*B60Q 3/62* (2017.01)
*B60Q 3/233* (2017.01)
*B60Q 3/78* (2017.01)

(52) U.S. Cl.
CPC .............. *B60Q 3/62* (2017.02); *B60Q 3/233* (2017.02); *B60Q 3/78* (2017.02)

(58) Field of Classification Search
CPC . B60Q 3/62; B60Q 3/233; B60Q 3/20; B60Q 3/208; B60Q 3/78; B60Q 3/74; B60Q 3/217; G02B 6/0036
USPC ......................................... 362/511, 488, 626
See application file for complete search history.

(56) References Cited

U.S. PATENT DOCUMENTS

| | | | |
|---|---|---|---|
| 2006/0034092 A1 | 2/2006 | Okazaki et al. | |
| 2009/0196058 A1 | 8/2009 | Ishida et al. | |
| 2012/0257402 A1* | 10/2012 | Hayashi | B60Q 3/233 362/516 |
| 2015/0003093 A1* | 1/2015 | Omura | B60Q 3/78 362/511 |
| 2016/0107566 A1* | 4/2016 | Gasahl, IV | B60Q 3/78 362/581 |
| 2021/0190296 A1* | 6/2021 | Andersson | B60Q 3/225 |

FOREIGN PATENT DOCUMENTS

| | | |
|---|---|---|
| JP | 2009-184421 A | 8/2009 |
| JP | 2009-184668 A | 8/2009 |

* cited by examiner

*Primary Examiner* — Laura K Tso
(74) *Attorney, Agent, or Firm* — Posz Law Group, PLC (57) ABSTRACT

The vehicle interior component includes a front surface side space and a slit. A light emitting part, which is disposed on a vehicle interior outer side with respect to at least one of the vehicle interior outer side end of the panel lower portion of the upper panel and the vehicle interior outer side end of the panel upper portion of the lower panel and emits light emitted obliquely upward toward an inside of a vehicle interior through the slit, is provided.

4 Claims, 4 Drawing Sheets

VEHICLE INTERIOR-DEDICATED LIGHT EMITTING DEVICE

CROSS-REFERENCE TO RELATED APPLICATIONS

This application is based on and claims priority under 35 USC 119 from Japanese Patent Application No. 2021-127850 filed on Aug. 3, 2021.

TECHNICAL FIELD

The present disclosure relates to a vehicle interior-dedicated light emitting device.

BACKGROUND ART

In the related art, a vehicle interior-dedicated light emitting device which emits light toward a vehicle interior has been known (for example, see JP-A-2009-184668). The vehicle interior-dedicated light emitting device disclosed in JP-A-2009-184668 is configured such that light is emitted from a boundary portion between an upper panel and a lower panel of an instrument panel, which is a vehicle interior component. The upper panel has, at a panel lower portion, an inclined surface which is inclined obliquely downward toward an inside of a vehicle interior. The lower panel has, at a panel upper portion, an inclined surface which is inclined obliquely upward toward the inside of the vehicle interior. On a vehicle interior inner side, a front surface side space is formed between the panel lower portion of the upper panel and the panel upper portion of the lower panel, which divides the instrument panel into upper and lower parts. The front surface side space is a recessed groove space extending in a columnar shape in a vehicle width direction, and communicates with a vehicle interior space.

The above vehicle interior-dedicated light emitting device includes a light emitting part which is a light guide body extending in the vehicle width direction, and a light source which is disposed at a side of an end surface of the light emitting part in the vehicle width direction. The light emitting part emits, from a surface thereof, light which enters the light emitting part from the light source. A groove portion is formed in the vicinity of a boundary between the upper panel and the lower panel, in the panel lower portion of the upper panel of the instrument panel. The light emitting part is disposed in the groove portion of the upper panel, and emits light from the panel lower portion of the upper panel toward a surface of the panel upper portion of the lower panel. The light irradiated to the surface of the panel upper portion of the lower panel is reflected by the surface of the panel upper portion and is emitted toward the inside of the vehicle interior.

However, if the light emitted from the light emitting part disposed in the upper panel of the instrument panel is to be reflected by the surface of the lower panel and emitted toward the inside of the vehicle interior, the light needs to travel obliquely upward after once being emitted downward, and therefore, a structure which greatly reflects the light from the light emitting part is required. Therefore, there are many restrictions in determining a structure and position of the light emitting part, a light emitting direction, an inclination angle of the lower panel, and the like.

SUMMARY OF INVENTION

The present disclosure has been made in view of the above circumstances, and an object of the present disclosure is to provide a vehicle interior-dedicated light emitting device capable of emitting light from a light emitting part to the inside of a vehicle interior without greatly deflecting the light.

According to an aspect of the present disclosure, there is provided a vehicle interior-dedicated light emitting device which emits light on a surface of a vehicle interior component including an upper panel and a lower panel disposed below the upper panel. The upper panel includes a first inclined surface facing obliquely downward on a vehicle interior inner side surface of a panel lower portion of the upper panel. The lower panel includes a second inclined surface facing obliquely upward on a vehicle interior inner side surface of a panel upper portion of the lower panel. The vehicle interior component includes: a front surface side space which is formed on a vehicle interior inner side between the panel lower portion of the upper panel and the panel upper portion of the lower panel; and a slit which is formed between a vehicle interior outer side end of the panel lower portion of the upper panel and a vehicle interior outer side end of the panel upper portion of the lower panel, or is formed to penetrate through the panel upper portion of the lower panel. A light emitting part, which is disposed on a vehicle interior outer side with respect to at least one of the vehicle interior outer side end of the panel lower portion of the upper panel and the vehicle interior outer side end of the panel upper portion of the lower panel and emits light emitted obliquely upward toward an inside of a vehicle interior through the slit, is provided.

According to this configuration, the light emitted by the light emitting part travels obliquely upward toward the slit from the vehicle interior outer side to the vehicle interior inner side, and is emitted to the inside of the vehicle interior through the slit. Therefore, when the light emitted from the light emitting part is emitted from the vicinity of a boundary between the upper panel and the lower panel of the vehicle interior component toward the inside of the vehicle interior, it is not necessary to reflect the light emitted from the light emitting part on the surface of the upper panel, the lower panel, or the like, and it is not necessary to greatly deflect the light emitted from the light emitting part before the light reaches the inside of the vehicle interior. Therefore, the light from the light emitting part can be emitted toward the inside of the vehicle interior without being greatly deflected.

DESCRIPTION OF EMBODIMENTS

Hereinafter, a specific embodiment of a vehicle interior-dedicated light emitting device according to the present disclosure will be described.

1. Configuration of Vehicle Interior-Dedicated Light Emitting Device

Figure 1:
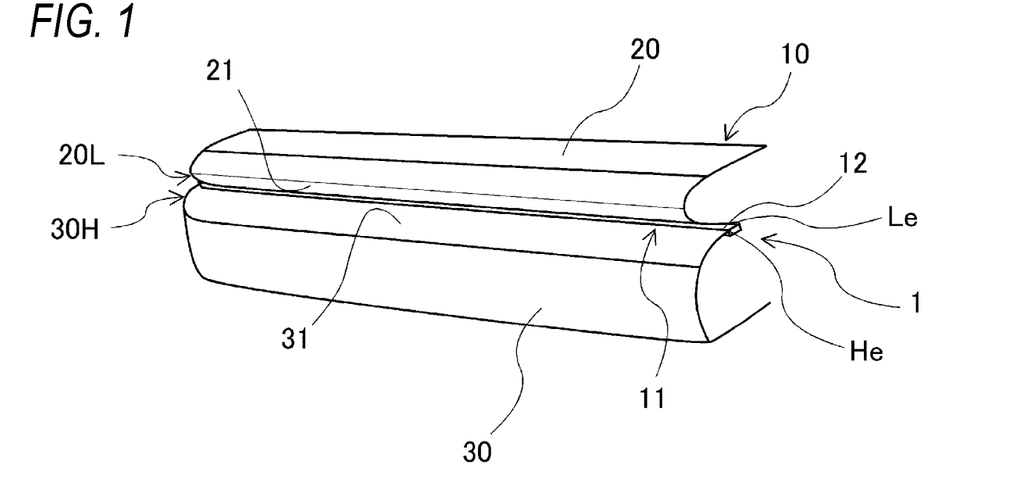
FIG. 1 is a perspective view of a vehicle interior component to which a vehicle interior-dedicated light emitting device according to an embodiment of the present disclosure is attached.

A vehicle interior-dedicated light emitting device 1 according to an embodiment is a device which is mounted on a vehicle and emits light toward an inside of a vehicle interior. The vehicle interior-dedicated light emitting device 1 emits light mainly for the purpose of notification such as calling for the attention of a driver of the vehicle through vision. As illustrated in FIG. 1, the vehicle interior-dedicated light emitting device 1 emits light toward a surface of an instrument panel 10 provided in front of a driver's seat or an assistant driver's seat in the vehicle, for example.

The instrument panel 10 is a vehicle interior component provided with vehicle instruments, an air conditioner vent, and the like. The instrument panel 10 extends in a vehicle width direction, and is formed in a linear shape from one end side in the vehicle width direction to the other end side in the vehicle width direction or in a curved shape curved in a vehicle front-rear direction. The instrument panel 10 is formed to be divided into upper and lower parts. Instrument panels 10 may be separately provided on the driver's seat side and the assistant driver's seat side and have unique shapes respectively, and in this case, each instrument panel 10 is divided into upper and lower parts.

The instrument panel 10 includes an upper panel 20 and a lower panel 30. The upper panel 20 constitutes an upper portion of the instrument panel 10. The lower panel 30 constitutes a lower portion of the instrument panel 10. The lower panel 30 is disposed below the upper panel 20. The vehicle interior-dedicated light emitting device 1 is configured such that light is emitted from a boundary portion between the upper panel 20 and the lower panel 30.

The instrument panel 10 has a front surface side space 11 which divides the instrument panel 10 into upper and lower parts. The front surface side space 11 is formed at a vehicle interior inner side (that is, a vehicle rear side) at the boundary portion between the upper panel 20 and the lower panel 30, that is, between a panel lower portion 20L of the upper panel 20 and a panel upper portion 30H of the lower panel 30. The front surface side space 11 extends in a columnar shape in the vehicle width direction, and is integrated with a space inside the vehicle interior.

Figure 4:
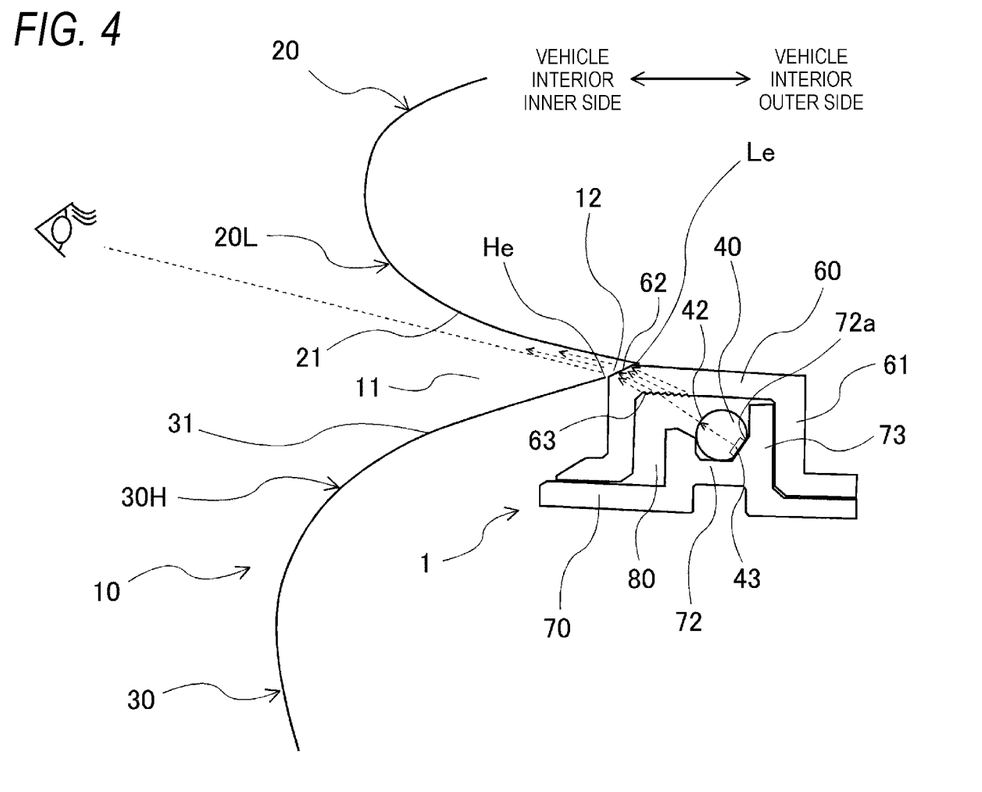
FIG. 4 is a cross-sectional view of the vehicle interior component and the vehicle interior-dedicated light emitting device according to the embodiment.

The upper panel 20 has a first inclined surface 21. The first inclined surface 21 is provided on a vehicle interior inner side surface of the panel lower portion 20L of the upper panel 20. The first inclined surface 21 faces obliquely downward on the vehicle interior inner side surface of the panel lower portion 20L. The panel lower portion 20L, including the first inclined surface 21, is formed so as to be inclined in a planar shape or is formed so as to be curved to protrude downward, as viewed from the side of the vehicle. A vehicle interior outer side end portion of the panel lower portion 20L may be formed to be inclined downward or substantially horizontal from a vehicle interior inner side to a vehicle interior outer side.

The lower panel 30 has a second inclined surface 31. The second inclined surface 31 is provided on a vehicle interior inner side surface of the panel upper portion 30H of the lower panel 30. The second inclined surface 31 faces obliquely upward on the vehicle interior inner side surface of the panel upper portion 30H. The panel upper portion 30H, including the second inclined surface 31, is formed so as to be inclined in a planar shape or is formed so as to be curved to protrude upward, as viewed from the side of the vehicle. A vehicle interior outer side end portion of the panel upper portion 30H may be formed to be inclined upward or substantially horizontal from the vehicle interior inner side to the vehicle interior outer side.

The instrument panel 10 has a slit 12. The slit 12 is a hole which opens in the vicinity of the boundary between the upper panel 20 and the lower panel 30. The slit 12 is formed between a vehicle interior outer side end Le of the panel lower portion 20L of the upper panel 20 and a vehicle interior outer side end He of the panel upper portion 30H of the lower panel 30. As illustrated in FIGS. 1 and 4, the vehicle interior outer side end Le of the panel lower portion 20L of the upper panel 20 is positioned on the vehicle interior outer side (that is, a vehicle front side) with respect to the vehicle interior outer side end He of the panel upper portion 30H of the lower panel 30, and is positioned at the same height as the vehicle interior outer side end He or above the vehicle interior outer side end He.

The slit 12 is provided at the deepest portion (that is, a vehicle interior outer side end portion) of the front surface side space 11. The slit 12 faces upward or obliquely upward toward the inside of the vehicle interior, from the back side to the front side of the instrument panel 10 (that is, across the front surface side space 11). The slit 12 extends in a band shape in the vehicle width direction. The slit 12 has a width of, for example, 2 mm to 3 mm. The slit 12 is provided at a position which can be directly visually recognized when viewed from the vehicle interior inner side (specifically, when viewed by a vehicle driver with the eyes thereof at a height in an assumed range).

Figure 2:
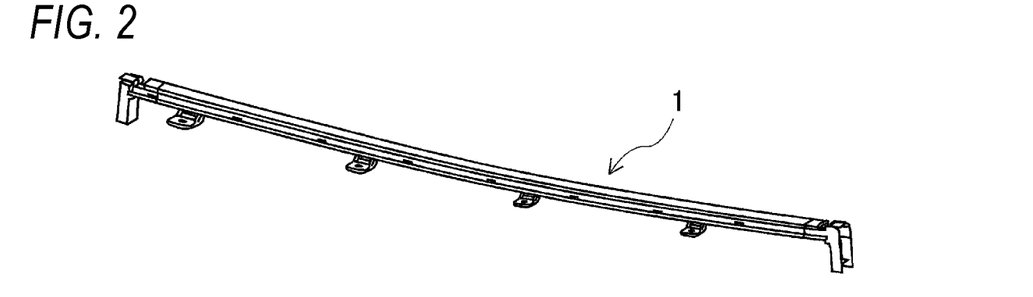
FIG. 2 is a perspective view of the vehicle interior-dedicated light emitting device according to the embodiment.
Figure 3:
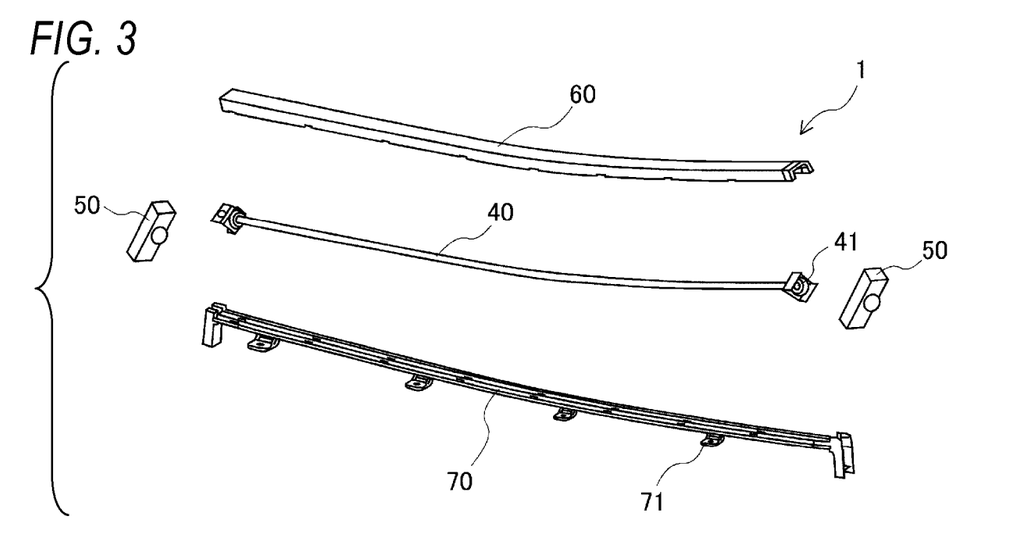
FIG. 3 is an exploded perspective view of the vehicle interior-dedicated light emitting device according to the embodiment.

As illustrated in FIGS. 1, 2, and 3, the vehicle interior-dedicated light emitting device 1 includes a light emitting part 40, light sources 50, an outer lens 60, and a retainer 70.

The light emitting part 40 is a part which emits light. The light emitting part 40 is a light guide body extending in a rod shape in the vehicle width direction. The light emitting part 40 reflects light from the light sources 50 to emit light. Hereinafter, the light emitting part 40 is referred to as a light guide body 40. The light guide body 40 is formed to have a substantially circular cross section. The light guide body 40 may be curved in the vehicle front-rear direction between end portions in the vehicle width direction (that is, an extending direction of the light guide body 40) in accordance with a surface shape of the instrument panel 10.

The light guide body 40 has light incident surfaces 41 into which light from the light sources 50 enters, and a light exit surface 42 from which the light entering the light incident surface 41 exits. The light incident surfaces 41 are formed on end surfaces of the light guide body 40 in the extending direction. The light exit surface 42 is formed on a peripheral surface of the light guide body 40. The light exit surface 42 may be limited to a part of the peripheral surface of the light guide body 40. The light from the light sources 50 enters the light incident surfaces 41 of the light guide body 40, and the light guide body 40 causes the entered light to travel along the extending direction of the light guide body 40 and reflects the traveling light toward the light exit surface 42 side so that the traveling light exits from the light exit surface 42.

Each light source 50 is a light emitting body such as an LED which emits visible light. The light source 50 is accommodated in a case. The light source 50 may be capable of outputting light of various colors, for example. The light sources 50 are connected to both ends of the light guide body 40 in the extending direction respectively. Each light source 50 is electrically connected to a control device (not illustrated), and light emission thereof is controlled by the control device. The light from the light sources 50 enters the light incident surfaces 41 at both ends of the light guide body 40 in the extending direction respectively, and the light guide body 40 reflects the entered light toward the light exit surface 42. The light entering the light guide body 40 from the light sources 50 substantially uniformly exits from the light exit surface 42 of the light guide body 40 over the extending direction of the light guide body 40.

Figure 5:
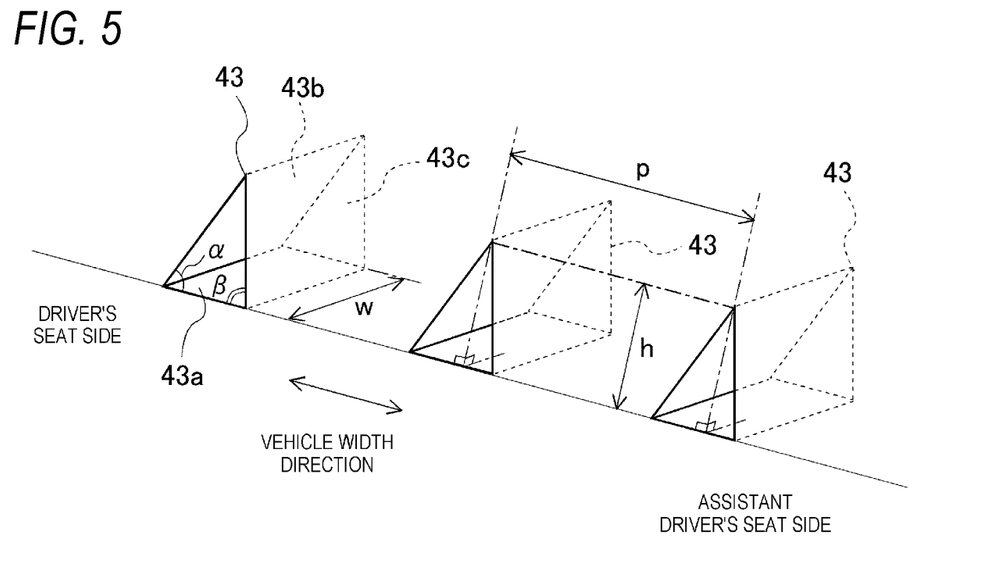
FIG. 5 is a perspective view illustrating a state in which a plurality of prisms provided in the vehicle interior-dedicated light emitting device according to the embodiment are arranged in an extending direction of a light guide body.

As illustrated in FIG. 5, the light guide body 40 has prisms 43. Each prism 43 is a mirror body for reflecting or refracting the light from the light sources 50. The prism 43 is formed in a polygonal column shape. The prism 43 is disposed inside the light guide body 40 at a position which is point-symmetrical to the light exit surface 42 with respect to an axial center of the light guide body 40. A portion of an inner surface of the light guide body 40 where the prism 43 is disposed is formed in a planar shape. Hereinafter, it is assumed that the prism 43 is formed in a triangular prism shape.

The prism 43 includes a bottom surface portion 43a, a first inclined surface portion 43b, and a second inclined surface portion 43c. The bottom surface portion 43a, the first inclined surface portion 43b, and the second inclined surface portion 43c form three surfaces of a triangular prism. The bottom surface portion 43a is a surface portion which extends along the extending direction. Each of the first inclined surface portion 43b and the second inclined surface portion 43c is a surface portion which extends while being inclined with respect to the extending direction. Each of the first inclined surface portion 43b and the second inclined surface portion 43c reflects or refracts the light from the light sources 50.

The bottom surface portion 43a is in contact with the inner surface inside the light guide body 40 at a position which is point-symmetrical to the light exit surface 42 with respect to the axial center of the light guide body 40. Each of the first inclined surface portion 43b and the second inclined surface portion 43c protrudes from the bottom surface portion 43a so as to prevent light from traveling inside the light guide body 40. The first inclined surface portion 43b and the second inclined surface portion 43c are in line contact with each other since protruding ends thereof are in contact with each other. The first inclined surface portion 43b is disposed on the driver's seat side in the extending direction. The second inclined surface portion 43c is disposed on the assistant driver's seat side in the extending direction.

Figure 6:
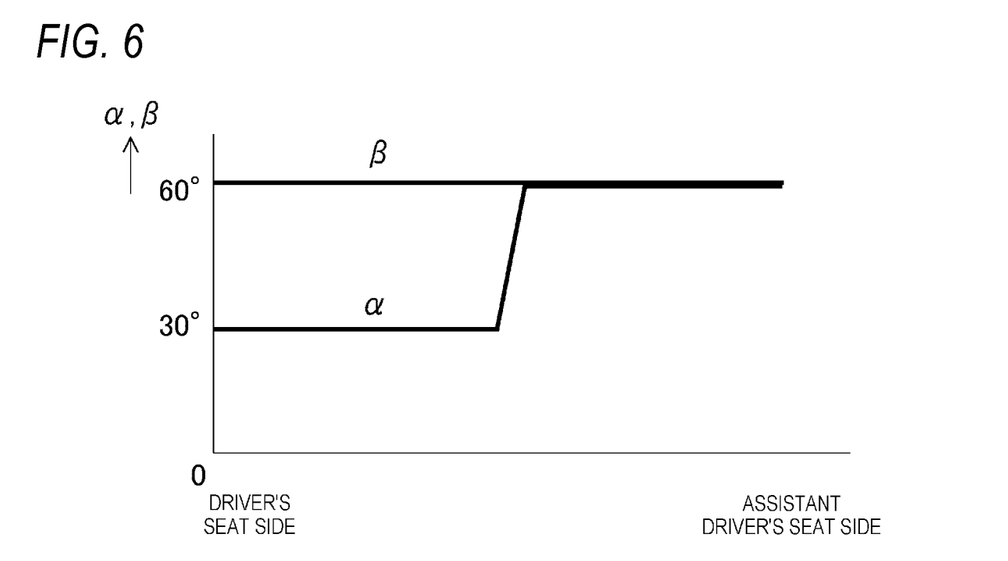
FIG. 6 is a graph illustrating angles α and β formed by inclined surfaces of the prisms provided in the vehicle interior-dedicated light emitting device according to the embodiment.

The bottom surface portion 43a and the first inclined surface portion 43b form an angle α. That is, the angle α is an angle formed by the first inclined surface portion 43b with respect to a direction from the driver's seat side to the assistant driver's seat side in the extending direction of the light guide body 40. The bottom surface portion 43a and the second inclined surface portion 43c form an angle β. The angle β is an angle formed by the second inclined surface portion 43c with respect to a direction from the assistant driver's seat side to the driver's seat side in the extending direction of the light guide body 40. Each of the angles α and β is set to define a traveling direction of the light. The angle α is set to be equal to or smaller than the angle β. Each of the angles α and β is set to, for example, 70° or less (preferably 60° or less).

Figure 7:
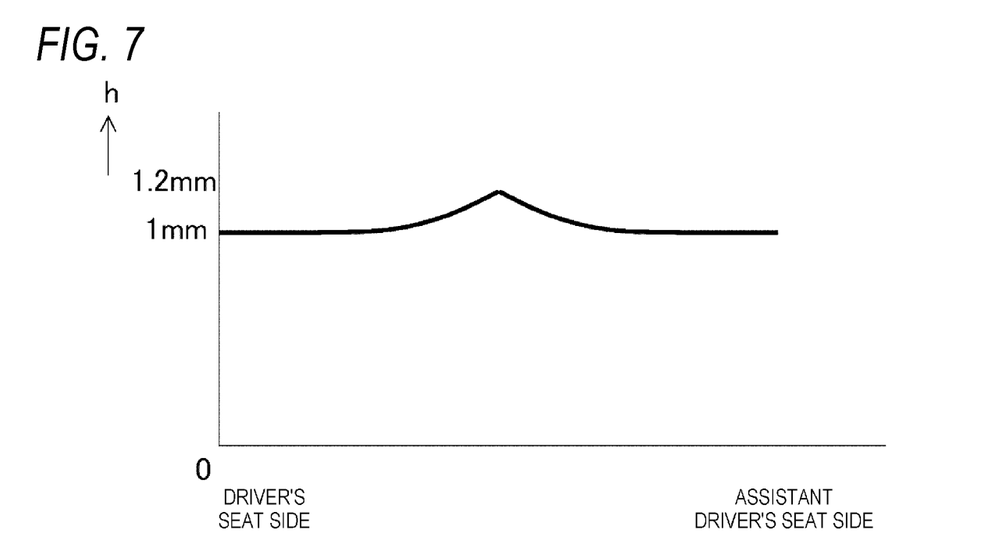
FIG. 7 is a graph illustrating a prism height h of the prisms provided in the vehicle interior-dedicated light emitting device according to the embodiment.
Figure 8:
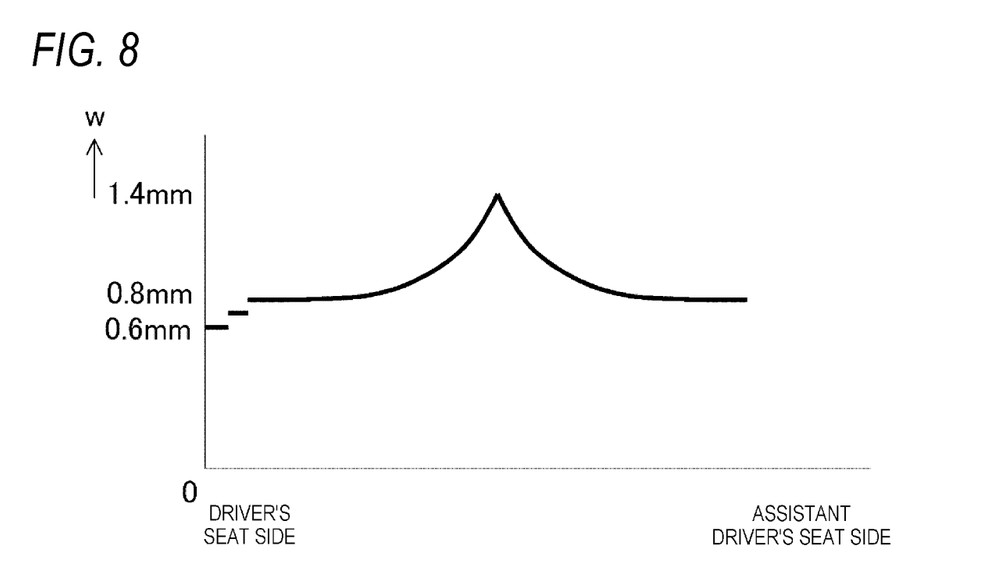
FIG. 8 is a graph illustrating a prism width w of the prisms provided in the vehicle interior-dedicated light emitting device according to the embodiment.

The prism 43 has a prism height h as a length from the bottom surface portion 43a to the protruding ends at which the first inclined surface portion 43b and the second inclined surface portion 43c are in contact with each other. The prism height h is a height of the first inclined surface portion 43b or the second inclined surface portion 43c in a direction perpendicular to the extending direction. The prism 43 has a prism width w as a prism length of the triangular prism shape. Each of the prism height h and the prism width w is set such that uniformity of the brightness in the vehicle width direction or a gentle change in intensity of the brightness, of the vehicle interior-dedicated light emitting device 1, is secured. The prism height h is set to, for example, 0.8 mm to 1.5 mm. The prism width w is set to, for example, 0.5 mm to 2 mm.

Figure 9:
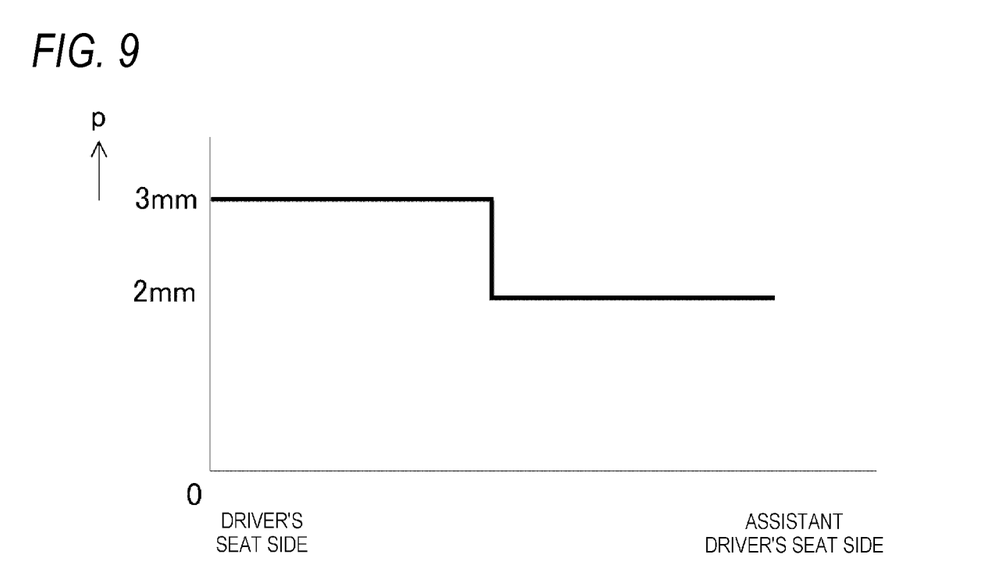
FIG. 9 is a graph illustrating a pitch p between adjacent prisms provided in the vehicle interior-dedicated light emitting device according to the embodiment.

A plurality of (for example, 300 to 400) prisms 43 are provided side by side in the extending direction of the light guide body 40. The prisms 43 are arranged at a predetermined pitch p in the extending direction. The predetermined pitch p is set such that the uniformity of the brightness in the vehicle width direction or the gentle change in intensity of the brightness, of the vehicle interior-dedicated light emitting device 1, is secured. The predetermined pitch p is set to, for example, 1.5 mm to 3.5 mm. In order to make the light emission of the vehicle interior-dedicated light emitting device 1 substantially uniform over the extending direction of the light guide body 40 when viewed from the driver of the vehicle, it is preferable that the predetermined pitch p is changed in accordance with a position of the prism 43 in the extending direction (specifically, a relative positional relationship between the prism 43 and the vehicle driver's seat) as illustrated in FIG. 9. For example, the predetermined pitch p may be set in two gradations such that the predetermined pitch p on the vehicle driver's seat side is larger than that on the assistant driver's seat side.

In addition, in order to make the light emission of the vehicle interior-dedicated light emitting device 1 substantially uniform over the extending direction of the light guide body 40 when viewed from the driver of the vehicle, it is preferable to set the following conditions. Specifically, as illustrated in FIG. 6, the angle α is preferably changed in accordance with the position of the prism 43 in the extending direction (specifically, the relative positional relationship between the prism 43 and the vehicle driver's seat). For example, the angle α may be set in two gradations such that the angle α on the assistant driver's seat side is larger than that on the vehicle driver's seat side. The angle β may be a constant value equal to or larger than the angle α regardless of the position of the prism 43 in the extending direction.

As illustrated in FIGS. 7 and 8, the prism height h and the prism width w are preferably changed according to a distance of the prism 43 from the light source 50. For example, the prism height h may be set to increase as the distance from the light source 50 increases. The prism width w may be set to increase as the distance from the light source 50 increases.

Note that the distance from the light source 50 is a distance from a closer light source 50 of the two light sources 50.

The outer lens 60 is a lens for emitting light emitted from the light guide body 40 to an outside of the vehicle. The outer lens 60 extends in the extending direction of the light guide body 40. The outer lens 60 is provided so as to cover the light guide body 40. Specifically, the outer lens 60 has an accommodating portion 61 which defines an accommodating space 80 for accommodating the light guide body 40. The accommodating portion 61 is formed to have a U-shaped cross section or a semicircular cross section. The outer lens 60 covers the light guide body 40 from above and in the vehicle front-rear direction such that an opening of the accommodating portion 61 faces downward. The outer lens 60 may be curved toward the vehicle front-rear direction along the extending direction of the light guide body 40 in accordance with the curvature of the light guide body 40.

The outer lens 60 has an exposed surface 62. The exposed surface 62 is a design surface portion which is exposed to the vehicle interior inner side through the slit 12. The exposed surface 62 is provided in the vicinity of an upper corner portion of the accommodating portion 61 on the vehicle interior inner side, and extends along the slit 12. The exposed surface 62 is formed in a transmissive portion through which the light emitted from the light guide body 40 can be transmitted. The light from the light guide body 40 is emitted toward the inside of the vehicle interior through the exposed surface 62.

Further, the outer lens 60 has a knurled portion 63. The knurled portion 63 is a portion formed of a large number of unevennesses extending along an extending direction of the outer lens 60. The knurled portion 63 is provided on an inner surface of the accommodating portion 61, which is opposite to the exposed surface 62. The knurled portion 63 has a function of preventing diffusion of light when the light emitted from the light guide body 40 enters the outer lens 60 and facilitating emission of the light toward the inside of the vehicle interior.

In order to prevent the unevenness of the knurled portion 63 provided on the inner surface of the outer lens 60 from appearing as a bright line to a vehicle occupant, the exposed surface 62 may be embossed or the outer lens 60 may be formed of a transparent resin material containing a diffusing material.

A portion of the outer lens 60 other than the exposed surface 62 may have a non-transmissive portion for preventing light from leaking to the outside. The non-transmissive portion is colored, for example, in black. The non-transmissive portion is formed, for example, by two-color molding together with the exposed surface 62, or by coating a front surface or a back surface of a part of a transparent body in which the exposed surface 62 and the non-transmissive portion are integrally formed.

The retainer 70 is a plate-shaped holding body which holds the light guide body 40. The retainer 70 extends in the extending direction of the light guide body 40. The retainer 70 can also hold the light sources 50 connected to both ends of the light guide body 40 in the extending direction. The outer lens 60 is attached to the retainer 70. Attachment of the outer lens 60 to the retainer 70 is implemented by claw fitting or the like. The retainer 70 closes the opening of the accommodating portion 61 of the outer lens 60 to form the accommodating space 80 with the outer lens 60 attached. The retainer 70 is attached and fixed to the vehicle body side by screw fastening or the like at an attachment portion 71.

The retainer 70 includes a light guide body holding portion 72. The light guide body holding portion 72 is a portion for holding the light guide body 40. The light guide body holding portion 72 extends in the extending direction of the light guide body 40, and is formed to have a U-shaped cross section or a semicircular cross section. The retainer 70 is formed in white as a whole including the light guide body holding portion 72 in order to guide more light from the light guide body 40 toward the vehicle occupant via the light exit surface 42.

The light guide body holding portion 72 has an inclined surface 72a. The inclined surface 72a is provided on an inner surface of the light guide body holding portion 72 which is in contact with a surface at a position point-symmetrical to the light exit surface 42 with respect to the axial center of the light guide body 40. Specifically, the inclined surface 72a is a flat surface portion with which the bottom surface portion 43a of the prism 43 of the light guide body 40 is in contact. The light guide body holding portion 72 (in particular, the inclined surface 72a) is configured to reflect, to the light exit surface 42, light emitted from the surface of the light guide body 40 at the position point-symmetrical to the light exit surface 42.

An opening of the light guide body holding portion 72 is formed such that an opening width thereof decreases from a back side of the opening toward a front side of the opening. This is to stably hold the light guide body 40 in the light guide body holding portion 72, and to prevent the light guide body 40 having a substantially circular cross section from rotating in the light guide body holding portion 72 in a state where the light guide body 40 is held in the light guide body holding portion 72.

The exposed surface 62 of the outer lens 60 and the inclined surface 72a of the retainer 70 (that is, the bottom surface portion 43a of the prism 43 for the light guide body 40 to reflect or refract light) are formed such that both surfaces form an angle of, for example, 0° to 40°.

The retainer 70 includes a lens positioning portion 73. The lens positioning portion 73 is a wall portion for positioning the outer lens 60. The lens positioning portion 73 comes into contact with an inner surface of a side wall positioned on the opposite side (far side) of the exposed surface 62 in the accommodating portion 61 of the outer lens 60, thereby positioning the outer lens 60. The lens positioning portion 73 may also serve as a part of the light guide body holding portion 72.

In a state where the outer lens 60 is attached to the retainer 70, the retainer 70 and the outer lens 60 define the accommodating space 80. The light guide body 40 is accommodated in the accommodating space 80 while being held by the retainer 70. The light guide body 40 is positioned on the vehicle front side, which is the vehicle interior outer side, in the accommodating space 80, and is positioned on the vehicle front side with respect to the exposed surface 62 of the outer lens 60.

The light guide body 40 is disposed on the vehicle interior outer side (the vehicle front side) with respect to the vehicle interior outer side end He of the panel upper portion 30H of the lower panel 30, and is disposed on the vehicle interior outer side (the vehicle front side) with respect to the vehicle interior outer side end Le of the panel lower portion 20L of the upper panel 20. The light guide body 40 is disposed below the slit 12 which opens in the vicinity of the boundary between the upper panel 20 and the lower panel 30.

2. Assembly and Operation of Vehicle Interior-Dedicated Light Emitting Device

The vehicle interior-dedicated light emitting device 1 is assembled according to the following procedure. First, the light guide body 40 is attached to and held by the retainer 70, the light sources 50 are connected to both ends of the light guide body 40 in the extending direction, and the outer lens 60 is attached to the retainer 70 so as to cover the light guide body 40. When such assembly is performed, the light guide body 40 is accommodated in the accommodating space 80 defined by the retainer 70 and the outer lens 60. Then, the light guide body 40 is positioned on the vehicle interior outer side in the accommodating space 80.

Next, after the retainer 70, the light guide body 40, the light sources 50, and the outer lens 60 are assembled as described above, the vehicle interior-dedicated light emitting device 1 is attached to the back side of the instrument panel 10 (that is, the vehicle front side). The attachment of the vehicle interior-dedicated light emitting device 1 to the instrument panel 10 is performed such that the exposed surface 62 of the outer lens 60 is exposed to the vehicle interior inner side through the slit 12 opening in the vicinity of the boundary between the upper panel 20 and the lower panel 30.

When the vehicle interior-dedicated light emitting device 1 is attached to the instrument panel 10, the light guide body 40 is disposed on the vehicle interior outer side with respect to both the vehicle interior outer side end He of the panel upper portion 30H of the lower panel 30 and the vehicle interior outer side end Le of the panel lower portion 20L of the upper panel 20. The light guide body 40 is disposed below the slit 12 formed between the vehicle interior outer side end He of the lower panel 30 and the vehicle interior outer side end Le of the upper panel 20.

The vehicle interior-dedicated light emitting device 1 described above emits visible light from the light sources 50 when a predetermined condition is satisfied. The predetermined condition is a condition for calling for the attention of the vehicle driver or alerting the vehicle driver, and is, for example, to notify the driver of an own vehicle that a preceding vehicle present in front of the own vehicle is started from a stopped state, or to notify the driver of the own vehicle that an inter-vehicle distance between the own vehicle and a preceding vehicle present in front of the own vehicle is shortening.

When the light sources 50 emit light, the light enters the light incident surfaces 41 of the light guide body 40 and travels in the light guide body 40 in the extending direction. The light traveling in the light guide body 40 is reflected or refracted by the prisms 43, and then travels obliquely upward from the vehicle interior outer side to the vehicle interior inner side in the light guide body 40 and exits from the light exit surface 42, as illustrated in FIG. 4. First, the light exiting from the light exit surface 42 of the light guide body 40 travels obliquely upward from the vehicle interior outer side to the vehicle interior inner side in the accommodating space 80, then enters the outer lens 60 from a back surface side, and is emitted from the exposed surface 62 to the inside of the vehicle interior (specifically, obliquely upward from the vehicle interior outer side to the vehicle interior inner side) through the slit 12.

In a state in which the light is emitted through the slit 12 as described above, the vehicle driver can visually recognize the light emitted from the slit 12 in the vicinity of the boundary between the upper panel 20 and the lower panel 30 of the instrument panel 10.

3. Effects of Vehicle Interior-Dedicated Light Emitting Device

In the vehicle interior-dedicated light emitting device 1 described above, the light emitted from the light guide body 40 travels obliquely upward from the vehicle interior outer side to the vehicle interior inner side in the accommodating space 80, and then travels obliquely upward from the vehicle interior outer side to the vehicle interior inner side from the exposed surface 62 of the outer lens 60 through the slit 12 to be emitted toward the inside of the vehicle interior.

According to the above configuration, when the light emitted from the light guide body 40 is emitted from the vicinity of the boundary between the upper panel 20 and the lower panel 30 of the instrument panel 10 toward the inside of the vehicle interior, it is not necessary to reflect the light emitted from the light guide body 40 on the surfaces of the upper panel 20, the lower panel 30, and the like, and it is not necessary to greatly deflect the light from the light guide body 40 until the light reaches the inside of the vehicle interior. Therefore, the light from the light guide body 40 can be emitted toward the inside of the vehicle interior without being largely deflected. Therefore, it is possible to reduce the restrictions in determining the structure and position of the light guide body 40, the light emitting direction, the inclination angle of the upper panel 20 and the lower panel 30, and the like.

The outer lens 60 has the exposed surface 62 which is exposed to the vehicle interior inner side through the slit 12. The slit 12 is provided at the deepest portion of the front surface side space 11 formed at the vehicle interior inner side between the panel lower portion 20L of the upper panel 20 and the panel upper portion 30H of the lower panel 30, and is formed between the vehicle interior outer side end Le of the panel lower portion 20L of the upper panel 20 and the vehicle interior outer side end He of the panel upper portion 30H of the lower panel 30.

Therefore, the exposed surface 62 of the outer lens 60 is disposed at the deepest portion of the front surface side space 11 and is exposed to the vehicle interior inner side. Therefore, the exposed surface 62 of the outer lens 60 can be made inconspicuous from the vehicle interior inner side when the vehicle interior-dedicated light emitting device 1 is not emitting light, so that it is possible to prevent the design of the instrument panel 10 from being impaired.

On the other hand, when the vehicle interior-dedicated light emitting device 1 emits light, a light emitting surface which appears in the vicinity of the boundary between the upper panel 20 and the lower panel 30 can be formed in a band shape or a line shape. In particular, even in the daytime during which the inside of the vehicle interior is bright, since the deepest portion of the front surface side space 11 is surrounded by the upper panel 20 and the lower panel 30, the surfaces of the upper panel 20 and the lower panel 30 located around the exposed surface 62 are dark. Therefore, the brightness of the exposed surface 62 in the vicinity of the boundary between the upper panel 20 and the lower panel 30 can be increased, and thus the visibility can be improved for the vehicle driver.

The retainer 70 and the outer lens 60 define the accommodating space 80 for accommodating the light guide body 40. The light guide body 40 is positioned on the vehicle interior outer side in the accommodating space 80. On the other hand, the exposed surface 62 of the outer lens 60 is provided in the vicinity of the upper corner portion of the accommodating portion 61 on the vehicle interior inner side. According to this structure, a distance between the light guide body 40 and the exposed surface 62 of the outer lens 60 can be secured to be large as compared with that in a structure in which the light guide body 40 is positioned on the vehicle interior inner side in the accommodating space 80, and thus the refraction of light at the outer lens 60 can be reduced to be small.

The outer lens 60 is positioned on the retainer 70 by the side wall of the accommodating portion 61 opposite to the exposed surface 62 coming into contact with the lens positioning portion 73. Therefore, the retainer 70 and the outer lens 60 can be easily and accurately assembled, and the assemblability can be improved.

The light guide body 40 includes a plurality of prisms 43 arranged side by side in the extending direction. Each of the prisms 43 has the inclined surface portions 43b and 43c which reflect or refract the light from the light sources 50. The prism height h of each prism 43 is changed according to the distance from the light source 50 to the prism 43, and increases as the distance from the light source 50 to the prism 43 increases. In such a configuration, since the prism height h increases as the prism 43 is farther from the light source 50, the light can be easily reflected toward the light exit surface 42 at a portion of the light guide body 40 farther from the light source 50 in the extending direction.

Therefore, even when the amount of reaching light decreases as the portion of the light guide body 40 is farther from the light source 50 in the extending direction, since the light is easily reflected toward the light exit surface 42, the light emitted from the light guide body 40 and the exposed surface 62 of the outer lens 60 can be made substantially uniform over the extending direction.

The prism width w of each prism 43 is changed according to the distance from the light source 50 to the prism 43, and increases as the distance from the light source 50 to the prism 43 increases. In such a configuration, since the prism width w increases as the prism 43 is farther from the light source 50, the light can be easily reflected toward the light exit surface 42 at a portion of the light guide body 40 farther from the light source 50 in the extending direction. Therefore, even when the amount of reaching light decreases as the portion of the light guide body 40 is farther from the light source 50 in the extending direction, since the light is easily reflected toward the light exit surface 42, the light emitted from the light guide body 40 and the exposed surface 62 of the outer lens 60 can be made substantially uniform over the extending direction.

The angle $\alpha$ of the first inclined surface portion 43b of each prism 43 is equal to or smaller than the angle $\beta$ of the second inclined surface portion 43c. The first inclined surface portion 43b is disposed on the driver's seat side in the extending direction of the light guide body 40, and the second inclined surface portion 43c is disposed on the assistant driver's seat side in the extending direction of the light guide body 40. According to such a configuration, a direction in which the first inclined surface portion 43b reflects the light from the light source 50 can be directed to the inside of the vehicle interior, and a direction in which the second inclined surface portion 43c reflects the light from the light source 50 can be directed to the inside of the vehicle interior. Therefore, the light can be efficiently guided toward the inside of the vehicle interior by the light guide body 40.

In addition, the angle $\alpha$ of the first inclined surface portion 43b of each prism 43 is changed according to the position of the prism 43 in the extending direction, and is set so as to be smaller on the driver's seat side and larger on the assistant driver's seat side. According to such a configuration, when the light emitted from the light source 50 is reflected by the prism 43, the light can be easily guided to the driver's seat side even at a position of the light guide body 40 on the assistant driver's seat side in the extending direction, and uniform light can be visually recognized by the driver over the entire range of the light guide body 40 in the extending direction. Therefore, it is possible to improve the visibility of light for the vehicle driver. Further, it is possible not to make the vehicle driver feel annoyed thanks to the uniformity of the light. It is possible to give the vehicle driver a notification such as calling for the attention of the vehicle driver casually.

Further, the prisms 43 are arranged at the predetermined pitch p in the extending direction. The predetermined pitch p is changed in accordance with the position of the prism 43 in the extending direction, and is set so as to be larger on the driver's seat side and smaller on the assistant driver's seat side. According to such a configuration, when the light emitted from the light source 50 is reflected by the prism 43, it is possible to increase the amount of light reflected at a portion of the light guide body 40 on the assistant driver's seat side in the extending direction, and it is possible to make the light reaching the driver uniform over the entire range of the light guide body 40 in the extending direction. Therefore, it is possible to improve the visibility of light for the vehicle driver. Further, it is possible not to make the vehicle driver feel annoyed thanks to the uniformity of the light. It is possible to give the vehicle driver a notification such as calling for the attention of the vehicle driver casually.

In the above-described embodiment, the instrument panel 10 corresponds to a "vehicle interior component" described in the claims, the first inclined surface portion 43b corresponds to an "inclined surface portion" described in the claims, the angle $\alpha$ corresponds to a "first angle" described in the claims, and the angle $\beta$ corresponds to a "second angle" described in the claims.

In the above-described embodiment, the instrument panel 10 is used as a vehicle interior component which emits light from the vehicle interior-dedicated light emitting device 1. However, the present invention is not limited thereto, and a door panel, a dashboard, a rear panel, or the like other than the instrument panel may be used as long as the component is a vehicle interior component.

In the above-described embodiment, the light sources 50 are provided correspondingly to both ends of the light guide body 40 in the extending direction. However, the present invention is not limited thereto, and a configuration may be applied in which the light source 50 is provided in any one side of the light guide body 40 in the extending direction.

In the above-described embodiment, the light guide body 40 is disposed on the vehicle interior outer side with respect to both the vehicle interior outer side end Le of the panel lower portion 20L of the upper panel 20 and the vehicle interior outer side end He of the panel upper portion 30H of the lower panel 30. However, the present invention is not limited thereto, and the light guide body 40 may be disposed at least on the vehicle interior outer side with respect to the vehicle interior outer side end He of the panel upper portion 30H of the lower panel 30.

Further, in the above-described embodiment, the slit 12 is formed between the vehicle interior outer side end Le of the panel lower portion 20L of the upper panel 20 and the vehicle interior outer side end He of the panel upper portion 30H of the lower panel 30, and the light guide body 40 is disposed on the vehicle interior outer side with respect to both the vehicle interior outer side end Le of the panel lower portion 20L of the upper panel 20 and the vehicle interior outer side end He of the panel upper portion 30H of the lower panel 30. However, the present invention is not limited thereto, and the slit 12 may be formed so as to penetrate through the panel upper portion 30H of the lower panel 30 (in particular, a portion of the panel upper portion 30H on the vehicle interior outer side end He side), and the light guide body 40 may be disposed at least on the vehicle interior outer side with respect to the vehicle interior outer side end Le of the panel lower portion 20L of the upper panel 20.

The present invention is not limited to the above-described embodiment and modifications thereof, and various modifications can be made without departing from the scope of the present invention.

The invention claimed is:

1. A vehicle interior-dedicated light emitting device which emits light on a surface of a vehicle interior component, the vehicle interior component including an upper panel and a lower panel disposed below the upper panel, wherein:
the upper panel includes a first inclined surface facing obliquely downward on a vehicle interior inner side surface of a panel lower portion of the upper panel;
the lower panel includes a second inclined surface facing obliquely upward on a vehicle interior inner side surface of a panel upper portion of the lower panel;
the vehicle interior component includes:
a front surface side space which is formed on a vehicle interior inner side between the panel lower portion of the upper panel and the panel upper portion of the lower panel; and
a slit which is formed between a vehicle interior outer side end of the panel lower portion of the upper panel and a vehicle interior outer side end of the panel upper portion of the lower panel, or is formed to penetrate through the panel upper portion of the lower panel;
the vehicle interior-dedicated light emitting device comprises a light emitting part, which is disposed on a vehicle interior outer side with respect to at least one of the vehicle interior outer side end of the panel lower portion of the upper panel and the vehicle interior outer side end of the panel upper portion of the lower panel and emits light emitted obliquely upward toward an inside of a vehicle interior through the slit;
the light emitting part is a light guide body which extends in a rod shape along the slit and reflects light from a light source which enters an end portion thereof in an extending direction;
the vehicle interior-dedicated light emitting device comprises an outer lens provided to cover the light guide body;
the outer lens has an exposed surface exposed to the vehicle interior inner side through the slit;
light reflected by the light guide body is emitted from the exposed surface toward the inside of the vehicle interior;
the light guide body includes a plurality of prisms arranged side by side in the extending direction;
each of the prisms has an inclined surface portion reflecting or refracting light from the light source; and
the plurality of prisms are formed such that a prism height, of the inclined surface portion, in a direction perpendicular to the extending direction increases as a distance from the light source to the prism increases.

2. The vehicle interior-dedicated light emitting device according to claim 1, further comprising:
a retainer which holds the light guide body and to which the outer lens is attached;
the retainer and the outer lens define an accommodating space accommodating the light guide body; and
the light guide body is positioned on the vehicle interior outer side in the accommodation space.

3. A vehicle interior-dedicated light emitting device which emits light on a surface of a vehicle interior component, the vehicle interior component including an upper panel and a lower panel disposed below the upper panel, wherein:
the upper panel includes a first inclined surface facing obliquely downward on a vehicle interior inner side surface of a panel lower portion of the upper panel;
the lower panel includes a second inclined surface facing obliquely upward on a vehicle interior inner side surface of a panel upper portion of the lower panel;
the vehicle interior component includes:
a front surface side space which is formed on a vehicle interior inner side between the panel lower portion of the upper panel and the panel upper portion of the lower panel; and
a slit which is formed between a vehicle interior outer side end of the panel lower portion of the upper panel and a vehicle interior outer side end of the panel upper portion of the lower panel, or is formed to penetrate through the panel upper portion of the lower panel;
the vehicle interior-dedicated light emitting device comprises a light emitting part, which is disposed on a vehicle interior outer side with respect to at least one of the vehicle interior outer side end of the panel lower portion of the upper panel and the vehicle interior outer side end of the panel upper portion of the lower panel and emits light emitted obliquely upward toward an inside of a vehicle interior through the slit;
the light emitting part is a light guide body which extends in a rod shape along the slit and reflects light from a light source which enters an end portion thereof in an extending direction;
the vehicle interior-dedicated light emitting device comprises an outer lens provided to cover the light guide body;
the outer lens has an exposed surface exposed to the vehicle interior inner side through the slit;
light reflected by the light guide body is emitted from the exposed surface toward the inside of the vehicle interior;
the light guide body includes a plurality of prisms arranged side by side in the extending direction;
each of the prisms has an inclined surface portion for reflecting or refracting light from the light source; and
the plurality of prisms are formed such that an angle formed by the inclined surface portion with respect to the extending direction changes in accordance with a relative positional relationship between the prism and a driver's seat.

4. A vehicle interior-dedicated light emitting device which emits light on a surface of a vehicle interior component, the vehicle interior component including an upper panel and a lower panel disposed below the upper panel, wherein:
the upper panel includes a first inclined surface facing obliquely downward on a vehicle interior inner side surface of a panel lower portion of the upper panel;
the lower panel includes a second inclined surface facing obliquely upward on a vehicle interior inner side surface of a panel upper portion of the lower panel;
the vehicle interior component includes:
a front surface side space which is formed on a vehicle interior inner side between the panel lower portion of the upper panel and the panel upper portion of the lower panel; and
a slit which is formed between a vehicle interior outer side end of the panel lower portion of the upper panel and a vehicle interior outer side end of the panel upper portion of the lower panel, or is formed to penetrate through the panel upper portion of the lower panel;

the vehicle interior-dedicated light emitting device comprises a light emitting part, which is disposed on a vehicle interior outer side with respect to at least one of the vehicle interior outer side end of the panel lower portion of the upper panel and the vehicle interior outer side end of the panel upper portion of the lower panel and emits light emitted obliquely upward toward an inside of a vehicle interior through the slit;

the light emitting part is a light guide body which extends in a rod shape along the slit and reflects light from a light source which enters an end portion thereof in an extending direction;

the vehicle interior-dedicated light emitting device comprises an outer lens provided to cover the light guide body;

the outer lens has an exposed surface exposed to the vehicle interior inner side through the slit;

light reflected by the light guide body is emitted from the exposed surface toward the inside of the vehicle interior;

the light guide body includes a plurality of prisms arranged side by side in the extending direction;

each of the prisms includes:
- a first inclined surface portion which is disposed on a driver's seat side in the extending direction and configured to reflect or refract light from the light source; and
- a second inclined surface portion which is disposed on an assistant driver's seat side in the extending direction and configured to reflect or refract light from the light source; and each of the prisms is formed such that a first angle formed by the first inclined surface portion with respect to a direction from the driver's seat side to the assistant driver's seat side in the extending direction is equal to or smaller than a second angle formed by the second inclined surface portion with respect to a direction from the assistant driver's seat side to the driver's seat side in the extending direction.

* * * * *